(12) United States Patent
Larner et al.

(10) Patent No.: US 7,342,611 B2
(45) Date of Patent: Mar. 11, 2008

(54) METHOD FOR RAPID POWER-ON TO FIRST PICTURE IN A DIGITAL CAMERA

(75) Inventors: Joel B. Larner, Fort Collins, CO (US); Mark J. Bianchi, Fort Collins, CO (US); David Staudacher, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 670 days.

(21) Appl. No.: 10/732,544

(22) Filed: Dec. 10, 2003

(65) Prior Publication Data

US 2005/0128345 A1  Jun. 16, 2005

(51) Int. Cl.
  *H04N 5/225* (2006.01)
(52) U.S. Cl. .............. 348/372; 348/208.16; 348/333.13
(58) Field of Classification Search ........... 348/333.13, 348/208.16, 372
  See application file for complete search history.

(56) References Cited

U.S. PATENT DOCUMENTS

| | | | | |
|---|---|---|---|---|
| 5,440,369 A | * | 8/1995 | Tabata et al. | 396/72 |
| 5,920,726 A | | 7/1999 | Anderson | |
| 6,002,436 A | * | 12/1999 | Anderson | 348/372 |
| 6,031,964 A | | 2/2000 | Anderson | |
| 6,282,665 B1 | | 8/2001 | Cruz | |
| 6,308,278 B1 | * | 10/2001 | Khouli et al. | 713/323 |
| 6,411,780 B1 | * | 6/2002 | Maruyama | 396/59 |
| 2002/0131788 A1 | * | 9/2002 | Nakaya | 399/88 |

* cited by examiner

*Primary Examiner*—David Ometz
*Assistant Examiner*—Usman Khan

(57) ABSTRACT

Digital cameras and methods that provide for a rapid camera power-on sequence. A warm-sleep state is defined in which the camera and nearly all of its internal components are shut down, yet just enough information is retained within high speed volatile storage and processing units to rapidly return the camera to full operating state. The warm-sleep state is managed to consume a minimum amount of power to keep the vital information intact. Upon receipt of a power-on indication, the camera then transitions from the warm-sleep state to full operation by simply activating the processing units, and continuing operation from the state it was in immediately prior to the power-off request.

26 Claims, 4 Drawing Sheets

Fig. 2
(PRIOR ART)
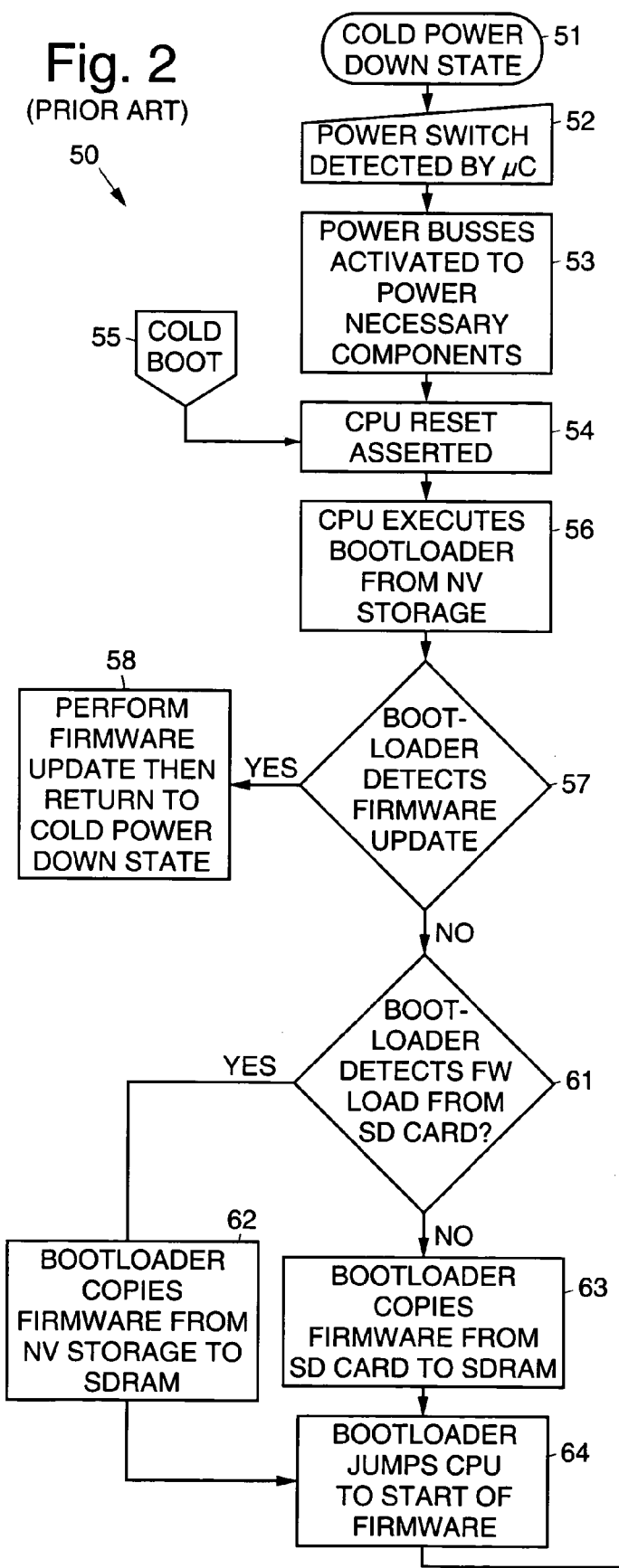
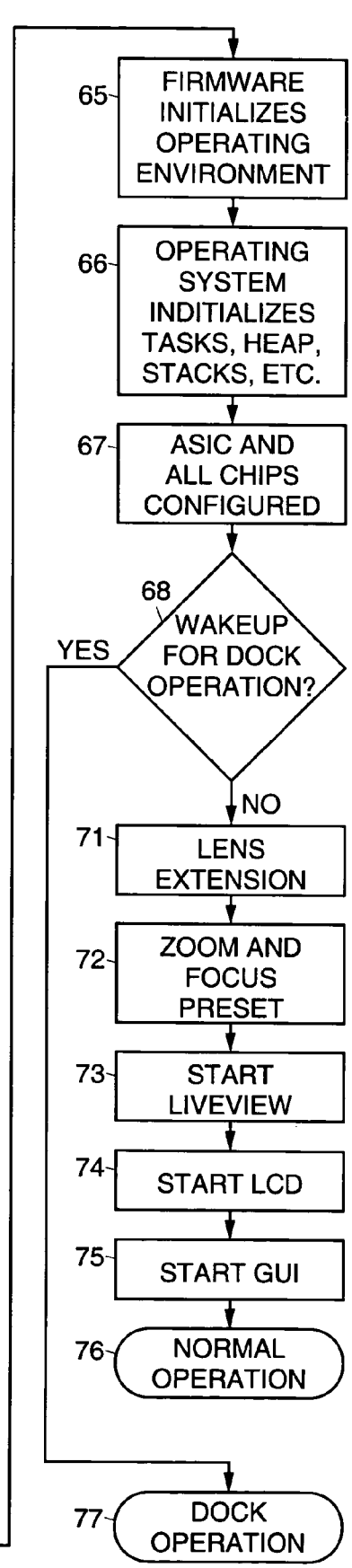

METHOD FOR RAPID POWER-ON TO FIRST PICTURE IN A DIGITAL CAMERA

TECHNICAL FIELD

The present invention relates generally to digital camera systems and related methods.

BACKGROUND

The power-on sequence for a conventional digital camera typically requires numerous time-consuming operations that classically take many seconds to complete. This sequence of operations must be completed before the camera is ready to begin operations to take a picture. Most cameras on the market today have a power-on time that is greater than 3 seconds, and often is longer than that. Customers are often dissatisfied with the relatively slow power-on time of digital cameras. It would be desirable to have a method that dramatically reduces the length of time between the time when a user turns the camera on and the time when the first picture may be taken.

The power-on lag is very frustrating to camera users because they want to be able to recognize a photo opportunity, turn the camera on, and take the picture immediately. Often the power-on lag is long enough that the moment is lost and they have missed the opportunity to take the picture because the scene or something within it has changed.

In prior solutions, when a camera power-down indication is given by the power switch, the camera retracts the lens, then terminates all operation in internal processing systems. Power is shut off to all of the camera processing systems with the exception of a power switch monitoring component. This brings the camera to the lowest possible power consumption state.

A number of patents have issued that relate to waking-up computers and digital cameras from a low power state. For example, U.S. Pat. No. 6,308,278 discloses "Supplying standby voltage to memory and wakeup circuitry to wake a computer from a low power mode."

U.S. Pat. No. 6,002,436 discloses a "Method and system for auto wake-up for time lapse image capture in an image capture unit." It is stated in U.S. Pat. No. 6,002,436 that "A system and method for time-lapse capture according to the present invention comprises capturing a first image automatically; initiating a sleep mode after capturing the first image; and transitioning from the sleep mode into a wake mode prior to capturing a second image."

U.S. Pat. No. 5,920,726 discloses a "System and method for managing power conditions within a digital camera device." U.S. Pat. No. 5,920,726 discusses powering up a digital camera.

U.S. Pat. No. 6,031,964 discloses a "System and method for using a unified memory architecture to implement a digital camera device" and discusses "method steps for performing a power-up sequence" for the digital camera.

U.S. Pat. No. 6,282,665 discloses a "Method and apparatus to reduce power consumption on a bus" by "placing a node in a standby state."

However, none of these patents specifically address apparatus or methods for use with a digital camera that reduces the time between camera power-on and the time when the first picture may be taken.

SUMMARY OF THE INVENTION

The present invention comprises digital cameras and methods that provide for a rapid camera power-on sequence. The present invention reduces the time between camera power-on and the time when the first picture may be taken.

In accordance with an embodiment of the present invention, a warm-sleep state is defined in which the camera and nearly all of its internal components are shut down, yet just enough information is retained within high speed volatile storage and processing units to rapidly return the camera to full operating state. The warm-sleep state is managed to consume a minimum amount of power to keep the vital information intact. Upon receipt of a power-on indication, the camera then transitions from the warm-sleep state to full operation by simply activating the processing units, and continuing operation from the state it was in immediately prior to the power-off request.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 2 is a flow diagram that illustrates a conventional power-up sequence employed in a digital camera;

DETAILED DESCRIPTION

Figure 1A:
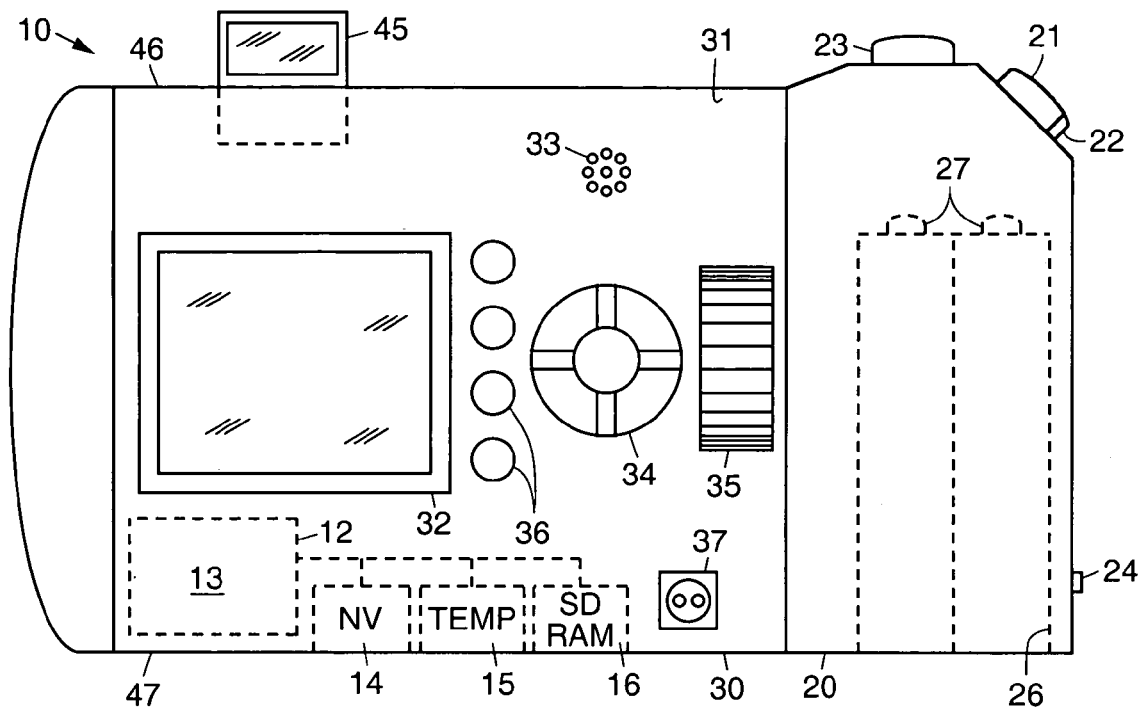
FIGS. 1a and 1b are rear and front views, respectively, of an exemplary embodiment of a digital camera in accordance with the principles of the present invention.
Figure 1B:
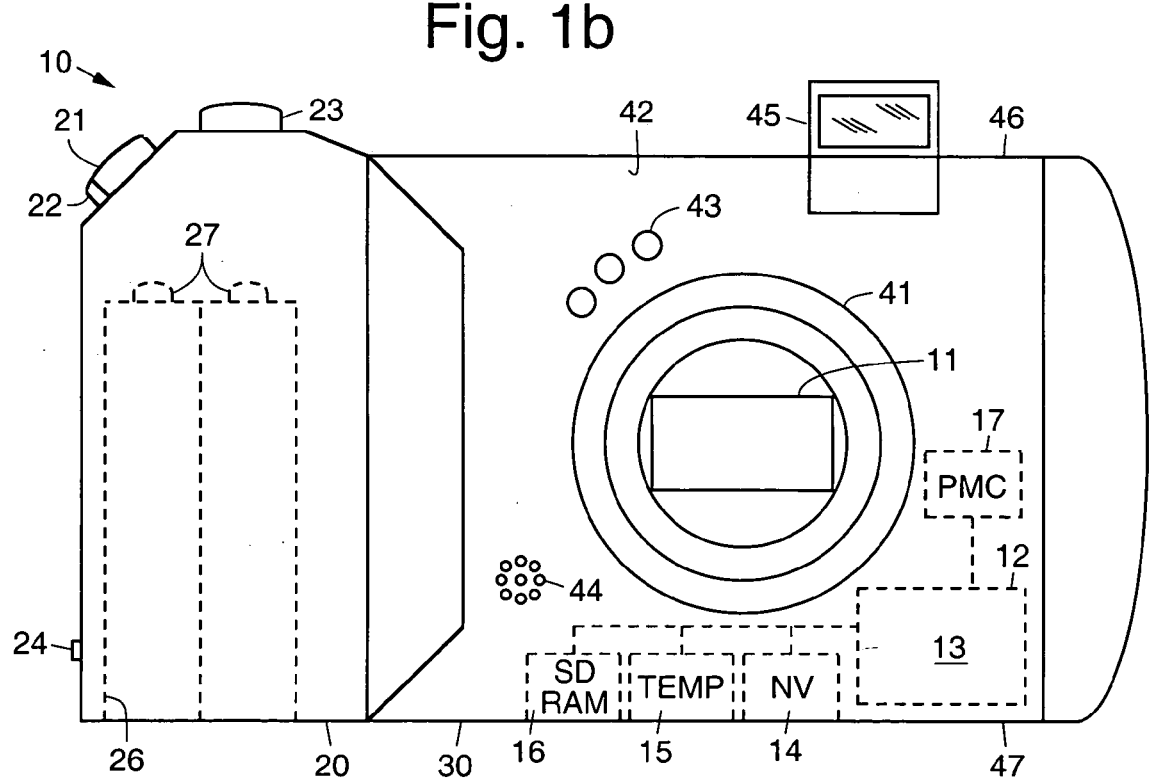

Referring to the drawing figures, FIGS. 1a and 1b are rear and front views, respectively, of an exemplary embodiment of a digital camera 10 in accordance with the principles of the present invention. The exemplary digital camera 10 will also be discussed in conjunction with a conventional power-up sequence 50 illustrated in FIG. 2.

As is shown in FIGS. 1a and 1b, the exemplary digital camera 10 comprises a handgrip section 20 and a body section 30. The handgrip section 20 includes a power button 21 or switch 21 having a lock latch 22, a record button 23, a strap connection 24, and a battery compartment 26 for housing batteries 27. The batteries may be inserted into the battery compartment 26 through an opening adjacent a bottom surface 47 of the digital camera 10.

As is shown in FIG. 1a, a rear surface 31 of the body section 30 comprises a liquid crystal display (LCD) 32 or viewfinder 45, a rear microphone 33, a joystick pad 34, a zoom control dial 35, a plurality of buttons 36 for setting functions of the camera 10 and an output port 37 for downloading images to a computer, for example. As is shown in FIG. 1b, a zoom lens 41 extends from a front surface 42 of the digital camera 10. A metering element 43 and front microphone 44 are disposed on the front surface 42 of the digital camera 10. A pop-up flash unit 45 is disposed adjacent a top surface 46 of the digital camera 10.

An image sensor 11 is coupled to processing circuitry 12 (illustrated using dashed lines) are housed within the body section 30, for example. An exemplary embodiment of the processing circuitry 12 comprises a microcontroller (µC) 12 or central processing unit (CPU) 12. The CPU 12 is coupled to a nonvolatile (NV) storage device 14, a temporary (TEMP) removable storage device 15, such as a secure digital (SD) card 15, a memory stick, an multimedia card, a compact flash card or other removable non-volatile storage 15, and a high speed (volatile) storage device 16, such as synchronous dynamic random access memory (SDRAM) 16.

As is shown in FIG. 1b, a power switch monitoring component (PMC) 17 is provided that is used to monitor depression of the power switch. The power switch monitoring component (PMC) 17 may be provided by the processing circuitry 12 (μC or CPU), or may be a separate component as is illustrated in FIG. 1b.

In the conventional digital camera 10, the processing circuitry 12 (microcontroller (μC) 12 or CPU 12) embodies a processing algorithm 13 that implements the conventional power-up sequence 50. This will be discussed in more detail with reference to FIG. 2.

In the present digital camera 10, the processing circuitry 12 (microcontroller μC) 12 or CPU 12) embodies a processing algorithm 13 that is used to implement power-down and warm-boot sequences in accordance with the principles of the present invention. These will be discussed in more detail with reference to FIGS. 3 and 4.

Referring to FIG. 2, it is a flow diagram that illustrates the conventional power-up sequence 50 employed in a conventional digital camera 10. When the camera power-down indication is given by the power switch 21, the camera 10 retracts the zoom lens 41, then terminates all operation in internal processing systems. Power is shut off to all of the camera processing systems with the exception of the power switch monitoring component (PMC) 17 (or the processing circuitry 12). This brings the camera 10 to the lowest possible power consumption state, which is a cold power down state 51.

Turning the conventional digital camera 10 on requires the following steps:

1. Power busses are activated 53 and power is applied to the CPU 12 when depression of the power switch 21 is detected 52 by the (μC or CPU 12).

2. The CPU 12 is reset 54 by performing a cold boot 55.

3. The CPU begins executing firmware 56 stored in a nonvolatile (NV) storage device 14. The first firmware to execute is commonly referred to as a bootloader.

4. The bootloader evaluates criteria to (a) determine if it should update 57 the firmware, and if so, download 58 new firmware into the nonvolatile storage device 14 from the temporary removable storage device 15 and returns to the cold power down state 51, and (b) determine 61 whether or not to load firmware from the temporary (TEMP) removable storage device 15 (SD card 15), wherein it loads 62 (copies 62) operational firmware from the nonvolatile storage device 14 into the SDRAM 16, or loads 63 (copies 63) operational firmware from the temporary (TEMP) removable storage device 15 (SD card 15) into the SDRAM 16.

5. The bootloader loads 62 (copies 62) firmware stored in the nonvolatile storage device 14 into a high speed storage device 16, such as the synchronous dynamic random access memory (SDRAM) 16, or loads 63 (copies 63) firmware stored in the temporary removable storage device 15 into a high speed storage device 16.

6. The bootloader jumps 64 the CPU 12 to the start point of the firmware.

7. The firmware initiates 65 the operating environment including copying initialized variable values from the nonvolatile storage device 14 into the high speed storage device 16, clearing all zeroed variable values in the high speed storage device 16, setting all initial operating values in the CPU 12 such as stack pointers, and initializing the operating system.

8. The operating system initializes 66 all of operating firmware including: establishing each of the initial tasks for operation including their individual stacks, establishing the heap, and initializing system services.

9. Tasks begin operating to accomplish normal operation 76 such as ASIC configuration, 67, wakeup 68 for dock operation 77, lens extension 71, base zoom and focus 72, startup 73 of liveview, startup 74 of the imaging system and the LCD 32, and startup 75 of a user interface displayed on the LCD 32. Normal operation 76 then commences. Liveview is a presentation of the scene the camera views as a continuous live display on the LCD 32, which is an electronic representation of the view through the viewfinder 45.

As was mentioned previously and as should be clear from the above discussion, completion of these numerous operations requires many seconds causing the power-on lag time that is experienced using the digital camera 10. In order to overcome this limitation, the present invention reduces the time between camera power-on and the time when the first picture may be taken.

Figure 3:
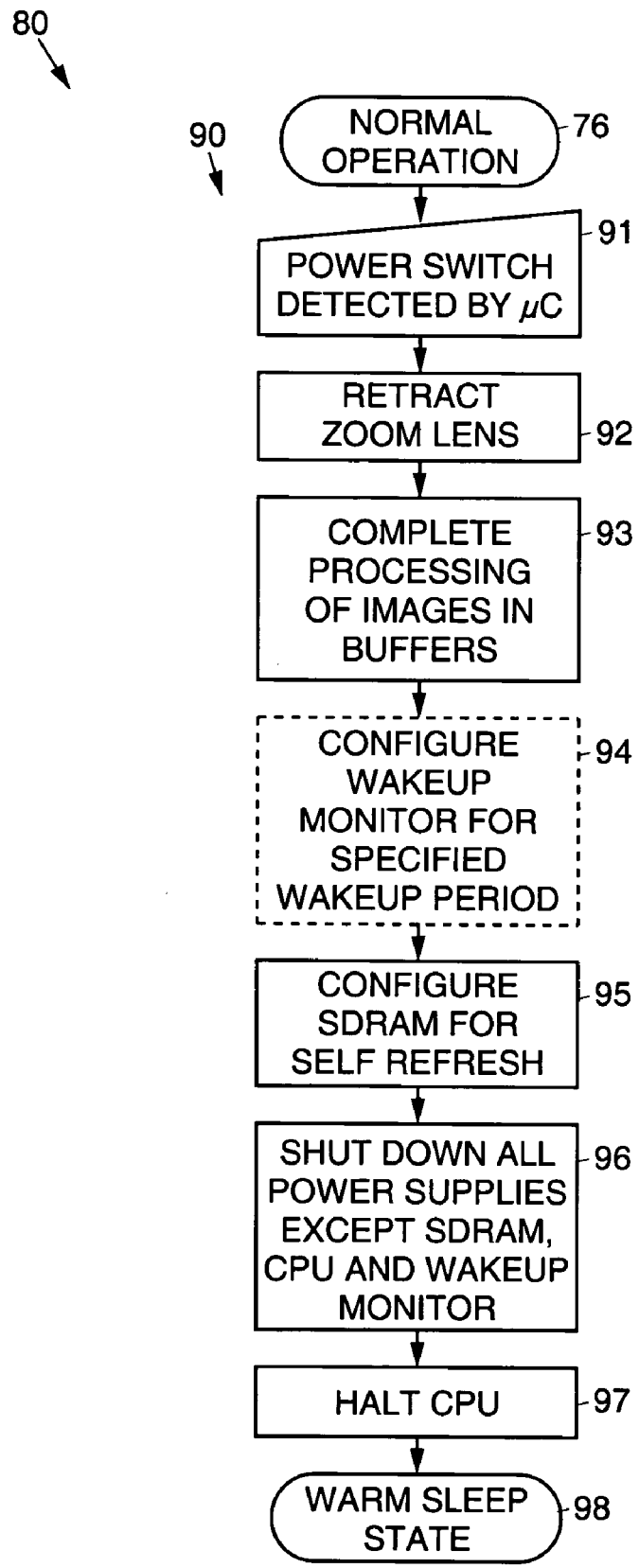
FIG. 3 is a flow diagram that illustrates steps in an exemplary embodiment of a power-down sequence or method in accordance with the principles of the present invention.
Figure 4:
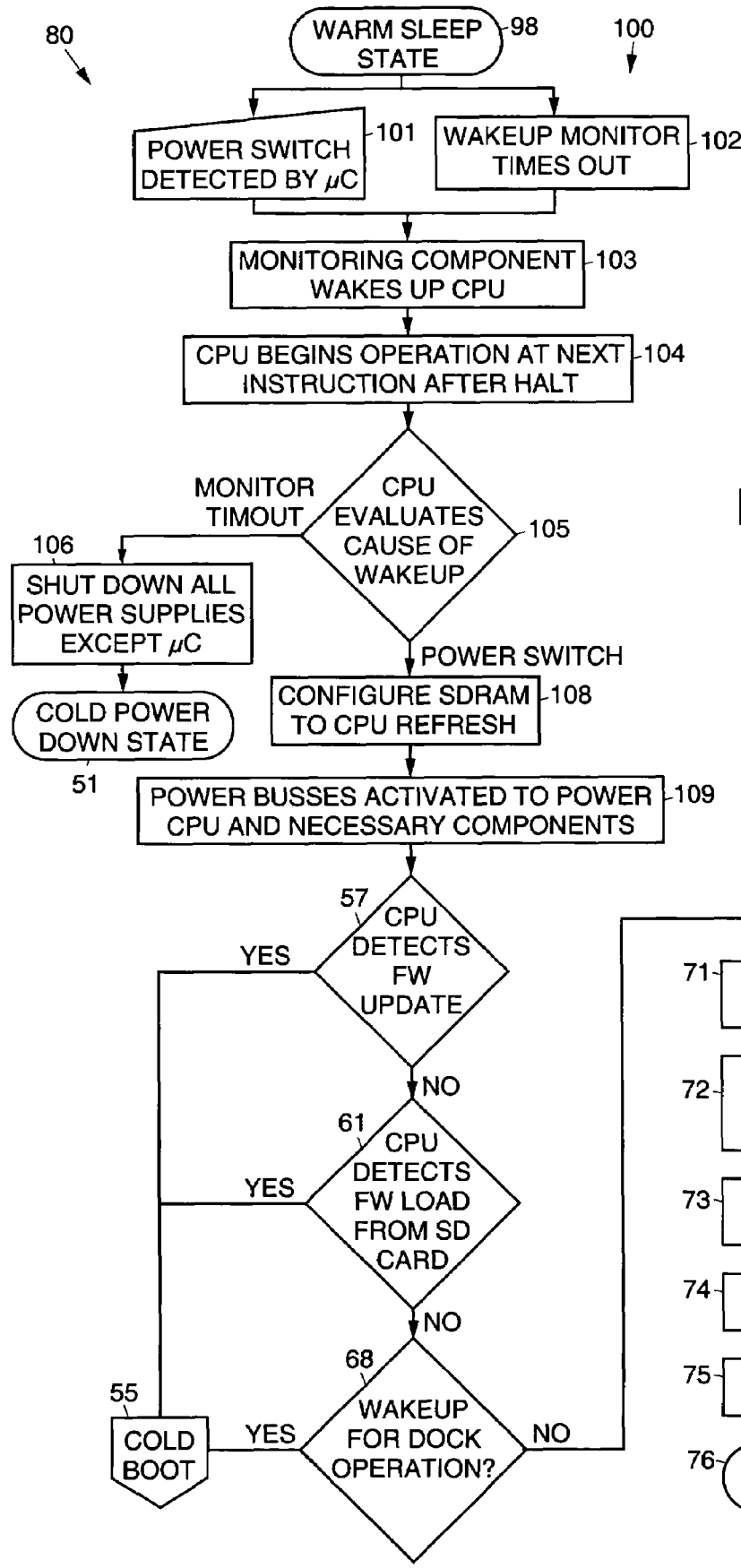
FIG. 4 is a flow diagram that illustrates steps in an exemplary embodiment of a warm-boot sequence or method in accordance with the principles of the present invention.

The present digital camera 10 and processing sequences 90, 100 that implement a method 80 in accordance with the principles of the present invention are illustrated in FIGS. 3 and 4. FIG. 3 is a flow diagram that illustrates steps in an exemplary embodiment of a power-down sequence 90, (or warm-sleep sequence 90) or method 90 in accordance with the principles of the present invention, and FIG. 4 is a flow diagram that illustrates steps in an exemplary embodiment of a warm-boot sequence 100 or method 100 in accordance with the principles of the present invention.

Referring to FIG. 3, the digital camera 10 starts in normal operation 76. When a power down indication is given by the power switch 21 where activation of the power switch 21 is detected 91 by the power switch monitoring component 17, or the CPU 12, for example, the camera 10 (via the CPU 12 and processing algorithm 13) initiates the warm-sleep sequence 90 instead of a full power-down sequence. The warm-sleep sequence 90 may be implemented as a specific task within the operating environment, for example.

For the purposes of the present description, the power switch monitoring component 17 comprises the microcontroller (μC) 12, which is only for purposes of illustration. The power switch monitoring component 17 may also be a separate circuit that interfaces the power switch 21 to the microcontroller (μC) 12 or CPU 12 that performs the desired monitoring function.

In implementing the warm-sleep sequence 90, the zoom lens 41 is retracted 92, and images located in image buffers of the SDRAM 16 are processed 93 to completion. The volatile storage device 16 is placed 95 into a low-power self-sustaining state. This may be accomplished, for example, by placing 95 the SDRAM 16 into a self refresh mode. The power supplies for all components except the SDRAM, CPU, and power switch monitoring component 17 are turned off 96. The CPU is then instructed 97 to go into a low power consumption halt state, which puts the camera 10 in a warm-sleep state 98. The power switch monitoring component 17 may optionally be pre-configured to wake 94 the CPU 12 after a specified length of time has elapsed.

Referring to FIG. 4, the digital camera 10 is in the warm-sleep state 98. Upon detection 101 of activation of the power switch 21 or reaching the pre-configured timeout 102 of the wakeup monitor, the power switch monitoring component 17 wakes 103 the CPU 12 and brings it out of the halt state. The CPU 12 automatically continues operation 104 of its firmware at the next instruction in the warm-sleep sequence 90. The warm-sleep sequence 90 determines or evaluates 105 the cause of wakeup. If the cause is a result of the preconfigured timeout, the firmware executes a full power-down sequence and shuts down 106 all power supplies except the CPU 12 and enters a cold power down state 51. If the wakeup cause is a result of power switch activation, the firmware executes a shortened power-up sequence in accordance with the present invention. This sequence is shorter than the full power-up sequence discussed above, because steps 1 through 8 discussed with reference to FIG. 2 do not need to be accomplished.

Thus, if the wakeup cause is a result of power switch activation, the SDRAM 16 is configured 108 to refresh the CPU 12. Then the power busses are activated 109 to fully power the CPU 12 and other necessary components.

Once the power busses are activated 109, the warm boot sequence running on the CPU 12 determines 57 if the firmware should be updated. If it does (YES), a cold boot 55 is performed and the firmware is updated. If the firmware does not have to be updated (NO), the warm boot sequence determines 61 whether or not to load firmware from the temporary (TEMP) removable storage device 15 (SD card 15). If it does (YES), a cold boot 55 is performed and the firmware is loaded from the SD card 15. If the firmware does not have to load firmware from the SD card 15, (NO), it is determined if the camera 10 must wakeup 68 for dock operation. If it does (YES), a cold boot 55 is performed and dock operation is commenced. If dock operation is not required (NO), then lens extension 71, base zoom and focus 72, startup 73 of liveview and imaging system, startup 74 of the and the LCD 32, and startup 75 of a user interface displayed on the LCD 32. Normal operation 76 of the digital camera 10 then commences.

Since the CPU 12 never totally shuts down, it's registers are intact with their values from prior to the warm-sleep state 98, the contents of the firmware in the SDRAM 16 and the contents of the stack, heap, and other values are intact in the SDRAM 16. The CPU 12 continues from the next instruction after the halt 97, effectively the same as if it had never gone to sleep. Therefore, the warm-sleep sequence 90 only needs to perform the operations in step 9 discussed with reference to FIG. 2.

Additional logic may be implemented as part of the method 80 to make intelligent decisions regarding the warm-sleep timeout based on the situation. For example, if the camera 10 is plugged into a power supply, the warm-sleep timeout may be indefinite since power savings is not a concern. This provides instant-on functionality on a retail store shelf, for example, providing a demonstration of maximum performance.

Furthermore, the warm boot sequence 100 described with reference to FIG. 4 includes checks for firmware update 57 and dock connection 68. It is to be understood that these checks are not absolutely required to implement the present invention, but are clearly beneficial to a complete power management solution and can easily be incorporated into the invention as depicted in FIG. 4.

Using the present invention, the camera 10 may remain in the warm-sleep state almost indefinitely or for a predetermined period of time, then transition into the full powered down state. This timeout can be specified by a user, may be pre-defined using well-understood common camera use procedures, or can be learned by the camera 10 by monitoring a user's common use patterns.

The present invention thus provides a digital camera 10 embodying a method 80 that enables reduced power-on time, which is typically less than a second, limited primarily by the length of time necessary to extend the lens 41. For a digital camera 10 that has a very fast lens 41, for example, by using the present invention, the camera 10 can be turned on and be ready to take a picture in approximately ¾ of a second.

Using the present invention, digital cameras 10 have a power-on time that is shorter than the time necessary to move the camera 10 from a hand position when it deflects the power switch up to a photo-taking position. Thus, the camera 10 turns on nearly instantaneously for use, enabling the user to immediately capture a picture, thereby addressing this significant source of user dissatisfaction.

Thus, it should be clear that the present invention significantly reduces camera 10 power-on time so that the user can rapidly take a picture after power-on without having to wait numerous seconds and miss the photo opportunity. The present invention implements this power-on time reduction without the loss of any secondary power-on states.

The present invention accomplishes the power-on time reduction, yet can easily transition into a cold power-down state after a designated period of time if the user has not used the camera 10 during that period of time. This saves battery power when the camera 10 is no longer in use.

Thus, digital cameras and methods that provide for rapid power-on to first picture have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A camera comprising:
   a power switch;
   a display;
   an imaging system comprising an image sensor;
   a volatile storage device;
   a power switch monitoring component;
   processing circuitry coupled to the power switch, display, image sensor, volatile storage device and power switch monitoring component; and
   a processing algorithm that runs on the processing circuitry that implements a warm-sleep sequence that, if the camera is on:
   detects activation of the power switch;
   places the volatile storage device into a low-power self-sustaining state;
   turns off power to all components except the volatile storage device and power switch monitoring component;
   instructs the processing circuitry to enter a low power consumption halt state, which puts the camera in a warm-sleep state;
   detects activation of the power switch or reaches a preconfigured timeout of the power switch monitoring component;
   wakes up the processing circuitry to bring it out of the halt state and continues operation of its firmware at the next instruction;
   evaluates the cause of wakeup;
   if the cause is a result of the preconfigured timeout, executes a full power-down sequence and shuts down all power supplies except the processing circuitry to enter a cold power-down state; and if the wakeup cause is a result of power switch activation, configures the volatile storage device to be refreshed by the processing circuitry and activates power busses to fully power the processing circuitry and other necessary components.

2. The camera recited in claim 1 further comprising a temporary removable storage device coupled to the processing circuitry.

3. The camera recited in claim 1 further comprising a nonvolatile storage device coupled to the processing circuitry.

4. The camera recited in claim 1 further comprising a zoom lens, and wherein the processing algorithm retracts the zoom lens, and processes unprocessed images to completion.

5. The camera recited in claim 2 wherein the temporary removable storage device comprises a nonvolatile storage device selected from the group consisting of a secure digital card, a memory stick, a multimedia card, or a compact flash card.

6. The camera recited in claim 1 wherein the volatile storage device comprises synchronous dynamic random access memory (SDRAM).

7. The camera recited in claim 1 wherein the processing algorithm places the volatile storage device in a self refresh mode.

8. The camera recited in claim 1 wherein the processing algorithm pre-configures the power switch monitoring component to wake the processing circuitry after a specified length of time has elapsed.

9. The camera recited in claim 1 wherein the processing algorithm:
starts up liveview;
starts up of the imaging system and the display; and
starts up a user interface displayed on the display to commence normal camera operation.

10. The camera recited in claim 1 wherein the processing algorithm:
determines if firmware should be updated, and if it does, performs a cold boot and updates the firmware.

11. The camera recited in claim 1 wherein the processing algorithm:
determines whether or not to load firmware from the temporary removable storage device, and if it does, performs a cold boot and loads firmware from the temporary removable storage device into the volatile storage device.

12. The camera recited in claim 1 wherein the processing algorithm:
determines if the camera must wake up for dock operation, and if it does, performs a cold beet and commences dock operation.

13. The camera recited in claim 1 wherein the power switch monitoring component comprises the processing circuitry.

14. The camera recited in claim 1 wherein the timeout is user-defined.

15. The camera recited in claim 1 wherein the timeout is learned by the camera by monitoring a user's common use patterns.

16. A camera comprising:
a power switch;
image sensing means for sensing images viewed by the camera;
display means for displaying images viewed by the camera;
volatile storage means for storing images viewed by the camera;
a power switch monitoring component; and
processing means coupled to the power switch, display means, image sensing means, volatile storage means and power switch monitoring component, which processing means comprises a processing algorithm that implements a warm-sleep sequence that, if the camera is on:
detects activation of the power switch;
places the volatile storage means into a low-power self-sustaining state;
turns off power to all components except the volatile storage means and power switch monitoring component;
instructs the processing means to enter a low power consumption halt state, which puts the camera in a warm-sleep states;
detects activation of the power switch or reaches a pre-configured timeout of the power switch monitoring component;
wakes up the processing circuitry to bring it out of the halt state and continues operation of its firmware at the next instruction;
evaluates the cause of wakeup;
if the cause is a result of the preconfigured timeout, executes a full power-down sequence and shuts down all power supplies except the processing circuitry to enter a cold power-down state; and
if the wakeup cause is a result of power switch activation, configures the volatile storage device to be refreshed by the processing circuitry and activates power busses to fully power the processing circuitry and other necessary components.

17. The camera recited in claim 16 further comprising a zoom lens, and wherein the processing algorithm retracts the zoom lens, and processes unprocessed images to completion.

18. The camera recited in claim 16 wherein the processing algorithm:
starts up liveview;
starts up of the imaging system and the display means; and
starts up a user interface displayed on the display means to commence normal camera operation.

19. A method for use in a camera having a power switch, a display, a zoom lens, an image sensor, a nonvolatile storage device, a volatile storage device, a power switch monitoring component, and processing circuitry, comprising the steps of:
detecting activation of the power switch;
placing the volatile storage device into a low-power self-sustaining state;
turning off power to all components except the volatile storage device, and power switch monitoring component;
instructing the processing circuitry to enter a low power consumption halt state, which puts the camera in a warm-sleep state;
detecting activation of the power switch or reaching a pre-configured timeout of the power switch monitoring component;
waking up the processing circuit to bring it out of the halt state and continues operation of its firmware at the next instruction;

evaluating the cause of wakeup;

if the cause is a result of the preconfigured timeout, executing a full power-down sequence and shutting down all power supplies except the processing circuitry to enter a cold power down state;

if the wakeup cause is a result of power switch activation, configuring the volatile storage device to refresh the processing circuitry and activating power busses to fully power the processing circuitry and other necessary components; and resetting zoom and focus settings.

20. The method recited in claim 19 further comprising the steps of:

retracting the zoom lens; and processing unprocessed images to completion.

21. The method recited in claim 19 further comprising the steps of:

starting up liveview;

starting up of the imaging system and the display; and starting up a user interface displayed on the display to commence normal camera operation.

22. The method recited in claim 19 further comprising the step of:

determining if firmware should be updated, and if it does, performing a cold boot and updating the firmware.

23. The method recited in claim 19 further comprising the step of:

determining whether or not to load firmware from a temporary removable storage device, and if it does, performs a cold boot and loading firmware from the temporary removable storage device into the volatile memory device.

24. The method recited in claim 19 further comprising the step of:

determining if the camera must wake up for dock operation, and if it does, performs a cold boot and commencing dock operation.

25. The method recited in claim 19 wherein the timeout is user-defined.

26. The method recited in claim 19 wherein the timeout is learned by the camera by monitoring a user's common use patterns.

* * * * *

UNITED STATES PATENT AND TRADEMARK OFFICE
CERTIFICATE OF CORRECTION

| | | |
|---|---|---|
| PATENT NO. | : 7,342,611 B2 | Page 1 of 1 |
| APPLICATION NO. | : 10/732544 | |
| DATED | : March 11, 2008 | |
| INVENTOR(S) | : Joel B. Larner et al. | |

It is certified that error appears in the above-identified patent and that said Letters Patent is hereby corrected as shown below:

In column 7, line 52, in Claim 12, delete "beet" and insert -- boot --, therefor.

In column 8, line 18, in Claim 16, delete "states" and insert -- state --, therefor.

In column 8, line 65, in Claim 19, delete "circuit" and insert -- circuitry --, therefor.

Signed and Sealed this

Eighth Day of July, 2008

JON W. DUDAS
*Director of the United States Patent and Trademark Office*